United States Patent [19]

Ueno et al.

[11] Patent Number: 4,503,005

[45] Date of Patent: Mar. 5, 1985

[54] PROCESS FOR PRODUCING AN AROMATIC POLYESTER FIBER

[75] Inventors: Katsuji Ueno, Hirakata; Hiroaki Sugimoto, Takatsuki; Kazuo Hayatsu, Ibaraki, all of Japan

[73] Assignee: Sumitomo Chemical Company, Limited, Osaka, Japan

[21] Appl. No.: 486,486

[22] Filed: Apr. 19, 1983

[30] Foreign Application Priority Data

Apr. 28, 1982 [JP] Japan .................... 57-71840

[51] Int. Cl.$^3$ .................... B29B 1/02; B29B 3/00; B29F 3/00
[52] U.S. Cl. .................... 264/102; 264/140; 264/176 F; 528/308.2
[58] Field of Search .................... 528/308, 308.2; 264/176 F, 85, 101, 102, 140

[56] References Cited

U.S. PATENT DOCUMENTS

| | | | |
|---|---|---|---|
| 3,354,250 | 11/1967 | Killoran et al. | 264/176 F |
| 3,975,487 | 8/1976 | Cottis et al. | 264/210 F |
| 4,115,357 | 9/1978 | Deex et al. | 528/294 |
| 4,294,955 | 10/1981 | Harris | 264/176 F |
| 4,349,659 | 9/1982 | Kato et al. | 528/190 |

FOREIGN PATENT DOCUMENTS 56-104932  8/1981  Japan .

*Primary Examiner*—James Lowe
*Attorney, Agent, or Firm*—Stevens, Davis, Miller & Mosher

[57] ABSTRACT

In a process for producing an aromatic polyester fiber of high strength and high modulus of elasticity represented by the prescribed general formula, a process comprising grinding a polymer of the prescribed general formula to form ground particles having diameters of less than 3 mm and an average particle diameter of 0.5 mm or smaller; heat-treating the particles for 0.5 to 30 hr at a temperature between 100° and 350° C., at which temperature the particles do not fuse; melt-spinning the heat-treated particles at a temperature of 250° to 450° C. if the particles have a melt property such that the temperature at which the particles possess a shear rate of 51/sec (48,000 poise as melt viscosity) under a shear stress of $2.45 \times 10^6$ dynes/cm$^2$ is in the range of 200° to 350° C.; and thereafter heat-treating the resulting fiber for 0.5 to 50 hr at a temperature between 250° and 450° C., at which temperature the fiber does not fuse.

16 Claims, No Drawings

PROCESS FOR PRODUCING AN AROMATIC POLYESTER FIBER

This invention relates to a process for producing an aromatic polyester fiber of high strength and high modulus of elasticity. As fibers of high strength and high modulus of elasticity, aromatic polyamides (Japanese patent publication No. 2489/1972 and others) are popular and are used in various applications. However, these aromatic polyamides have many manufacturing problems because, for example, an expensive solvent is required in polymerization and sulfuric acid is required in spinning. Also, various efforts are being made to obtain fibers of high strength and high modulus of elasticity by melt-spinning aromatic polyesters utilizing their properties of giving anisotropic melts (Japanese Patent Application Kokai (Laid-open) No. 50594/1979, No. 135134/1980, etc.). However, no aromatic polyester fiber has yet been reported which is equal to or excels the above aromatic polyamide fibers in quality. Among the polyesters reported, the one described in Japanese Patent Application Kokai (Laid-open) No. 43223/1975 has the highest modulus of elasticity, however, it has various problems in spinning, etc. and does not give a high strength.

Under such circumstances, the inventors have earnestly conducted studies centering around aromatic polyesters having as their key skelton p-hydroxybenzoic acid which is considered to form anisotropic melts and gives highly crystalline polymers. As a result of these studies, the present invention has been reached, and it provides an aromatic polyester fiber that is improved in manufacturing properties and has a high strength and a high modulus of elasticity.

More specifically, the present invention relates to a process for producing an aromatic polyester fiber of high strength and high modulus of elasticity represented by the general formula A:

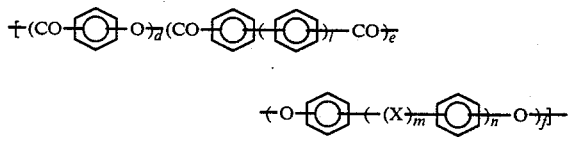

wherein X is an alkylene group of 1 to 4 carbon atoms, —O—, —S—, —SO$_2$— or —CO—, l, m and n each are 0 or 1, d:e is in the range of 1:5 to 20:1 e:f is in the range of 9:10 to 10:9, and a carbonyl group and an oxy group, two carbonyl groups and two oxy groups are each other in a meta or para or corresponding position, respectively. This process comprises grinding a polymer of the above general formula A to be processed into a fiber so that the ground particles have an average particle diameter of 0.5 mm or smaller and no particles having diameters of 3 mm or larger are contained therein, heat-treating these particles for 0.5 to 30 hr at a temperature between 100° and 350° C. at which the particles do not fuse, melt-spinning the heat-treated particles at 250° to 450° C. if the particles have such a melt property that a temperature range for the particles to possess a shear rate of 51/sec (48,000 poise as melt viscosity) under a shear stress of $2.45 \times 10^6$ dynes/cm$^2$ is 200° to 350° C., and thereafter heat-treating the resulting fiber for 0.5 to 50 hr at a temperature between 250° and 450° C. at which the fiber does not fuse.

In the course up to this invention, the inventors investigated thoroughly the prior art processes such as that of Japanese Patent Application Kokai (Laid-open) No. 43223/1975, and found that foaming and gelation occuring during spinning greatly affect the physical properties of fibers spun, and further examined earnestly conditions and means by which the above phenomena are avoided and good fibers of improved physical properties are produced. These efforts resulted in the present invention.

The present invention will now be described in more detail.

As the polymer used in the present invention, aromatic polyesters represented by the general formula A are desirable. Parahydroxybenzoic acid residue which is regarded as one unit of this structural formula is highly crystalline as indicated in Japanese Patent Publication No. 6796/1971, and the presence of this unit in the formula is particularly desirable. As the starting materials for synthesizing the polymer represented by the general formula A, there can be used parahydroxybenzoic acid, metahydroxybenzoic acid, terephthalic acid, isophthalic acid, dicarboxydiphenyl, hydroquinone, resorcin, 4,4'-dihydroxydiphenyl, 4,4'-dihydroxydiphenyl ether, 4,4'-dihydroxydiphenyl sulfide, 4,4'-dihydroxydiphenyl sulfone, 4,4'-dihydroxybenzophenone, bis(4-hydroxy)-2,2-diphenylpropane, etc. and their derivatives. It is preferable that these starting materials be used in the polymerization reaction after having been made functional. For instance, starting materials having phenolic hydroxyl groups are made functional by esterification with a carboxylic anhydride such as acetic anhydride or propionic anhydride or with a carboxylic acid halide such as acetyl chloride or benzoyl chloride. Carboxylic acids as starting material are made functional by esterification with an alcohol such as methyl alcohol, a phenol such as phenol or an ester such as phenyl acetate. By thus making the starting materials functional, polymerization can be accelerated. In order to improve the thermal stability of the polymer and to control the viscosity of the molten polymer, there may be used, together with the above starting materials, monofunctional materials. As the monofunctional materials, there may be mentioned o-phenylphenol, p-phenylphenol, p-tert-butylphenol, phenol, cresol, benzoic acid, p-phenylbenzoic acid and their functional derivatives.

It is desirable that the polymerization be conducted in a state substantially free from solvent. The reason is explained as follows. When a solvent is present to the end of polymerization, the solvent is contained in the polymer and, having often a high boiling point and/or a high polarity for its intended purpose, the solvent is difficult to remove by washing or drying and remains in the polymer. This solvent in the polymer causes foaming and thermal decomposition during spinning, which is not desirable from the process standpoint. Hence, it is preferable that the polymerization be carried out by a bulk polymerization in which the solvent is not substantially used. Any generally known bulk polymerization method may be used. As a preferable bulk polymerization method, there is a method in which a polymer is produced at a temperature as shown in Examples of this invention in which the polymerization is conducted by constantly adding a shear force to this polymer to prevent its solidification. One such example is a polymerization method using a horizontal jacketed reactor with one or two agitators, as described in Japanese Patent Application Kokai (Laid-open) No. 104932/1981.

The polymer obtained from the bulk polymerization method contains substances easy to decompose at high temperatures such as starting materials and low molecular weight polymers. Accordingly, it is necessary that the polymer be ground so as to have an average particle diameter of 0.5 mm or smaller and so as not to contain particles having diameters of 3 mm or larger, to make the surface area of the polymer as large as possible, and thereafter the ground particles are heat-treated at a temperature between 100° and 350° C., preferably between 150° and 300° C. at which temperature the particles do not fuse, to remove substances causing foaming and adhesion of decomposition products. It has been found from viscoelasticity measurements that 150° C. is a temperature around which many of the aromatic polyesters represented by the general formula A start molecular motion.

Since the aromatic polyesters represented by general formula A are stiff, some of these polyesters do not show the glass transition (primary dispersion) that high molecular substances generally do. However, these high molecular substances including the above aromatic polyesters show a phenomenon called "local mode relaxation" in which part of the molecular segments move, at a temperature of around 150° C. or higher. Because of this phenomenon, it is presumed that the polymer obtained from the bulk polymerization begins molecular motion at 100° C. or above, preferably 150° C. or above, and thereby the starting materials and the low molecular weight polymers contained in the polymer are removed. Heat treatment of the polymer must be made at a temperature at which the polymer particles do not fuse, because the particles begin to fuse as the treating temperature rises and consequently the surface area of the particles get smaller resulting in reduced effect of the heat treatment.

As the atmosphere in which the heat treatment of the polymer particles is conducted, an inert gas atmosphere or a vacuum atmosphere of 100 mm Hg or lower is desirable. Exposure of the polymer particles to oxygen for long time at high temperatures is not desirable, because it causes degradation, decomposition and crosslinking of the polymer which badly affect subsequent processes.

As the time of heat treatment of the polymer particles, 0.5 to 30 hr is usable. A time longer than this will not be critical unless the polymer causes degradation, decomposition, etc.

Molecular weight measurement for the heat-treated polymer is extremely difficult or causes extremely large errors at times depending upon the polymer composition. Because of this, as a yardstick for the melt property of the heat-treated polymer, there is used a temperature (referred to as "flow temperature" hereinafter) at which the polymer possesses a shear rate of 51/sec (48,000 poise as melt viscosity) under a shear stress of $2.45 \times 10^6$ dynes/cm². The heat-treated polymer should have a flow temperature of 200° to 350° C. and preferably of 250° to 330° C. The measurement of the flow temperature is carried out by using a Koka type flow tester manufactured by Shimadzu Seisakusho. A polymer powder is introduced into a cylinder having a nozzle (diameter: 1 mm, length: 10 mm), and under pressure (100 kg/cm²) a gradual temperature increase is applied, whereby a flow temperature is measured. When this flow temperature is lower than 200° C., the polymer particles are not desirable as a material for a fiber of high strength of this invention, because the polymer particles contain large quantities of the starting materials and the low molecular weight polymers which cause problems similar to those of remaining solvent aforementioned, or these particles give a slow rate of crystallization in spinning and thereafter. When the flow temperatures exceeds 350° C., the polymer particles must be heated to over 400° C. to be melt-spun in a viscosity of several hundred poises which is generally regarded as appropriate in melt spinning and this heating tends to cause decomposition, foaming, etc.

As the melt-spinning temperature, there is used 250° to 450° C., preferably 300° to 400° C. It is necessary to select a temperature giving a melt viscosity of 1000 poise or lower, although the temperature is changed depending on equipment for melt spinning. When the melt-spinning temperature is low, spinnability is poor. Conversely, when it exceeds 450° C., the aromatic polyester represented by the general formula A tends to cause decomposition and thereby foaming and gelation are invited. These become problems in manufacturing. Melt spinning is required to be conducted in an inert atmosphere and in a condition virtually free from air contact. In spinning, rapid spinning by use of a pressure may be employed and molecule orientation by rapid winding is also desirable.

The aromatic polyester fiber thus obtained does not have by itself sufficient strength, elongation and modulus of elasticity. This is because crystallization inside the fiber is not yet sufficient, and further the fiber has various drawbacks.

When this fiber is heat-treated at a temperature between 250° and 400° C. at which the fiber does not fuse, surprisingly the fiber increases its strength and modulus of elasticity greatly. However, when the processes leading up to the above-described spinning are not conducted according to those included in the scope of this invention, the effect of this heat-treating process of fiber is small. The reason for this is because polymers and fibers produced in processes not according to the scope of this invention are incomplete; and non-uniform and consequently crystallization, improvement of defects and increases of molecular weight for these polymers and fibers are not effected sufficiently in heat treatment. As the atmosphere in which the heat treatment of fiber is conducted, an inert gas atmosphere or an atmosphere having a vacuum of 100 mm Hg or lower is particularly desirable. Heat treatment in an atmosphere containing a large quantity of oxygen gives some degree of effect, but is not so effective as in the former atmospheres. The heat treatment may be conducted by use of a generally employed apparatus.

The present invention will now be illustrated in detail below by referring to Examples and Comparative Examples. However, these examples are only illustrative and are not intended to limit the scope of the present invention.

In the following Examples, tensile tests were conducted by using Universal Tester No. 1130 of Instron Co. at a distance between chucks of 20 mm and a deformation rate of 0.5 mm/min. The number of samples was 10 and an average excluding the maximum and minimum values, was calculated.

EXAMPLE 1

Into a polymerization tank having anchor-shaped agitating blades wherein a clearance between the tank wall and the blades is small, there were thrown 1,121.9 g (8.13 mole) of p-hydroxybenzoic acid, 337.4 g (2.03 mole) of terephthalic acid, 112.5 g (0.68 mole), of isophthalic acid, 504.1 g (2.71 mole) of 4,4'-dihydroxydiphenyl and 1,658.5 g (16.26 mole) of acetic anhydride. With stirring in a nitrogen atmosphere, the mixture was heated to 150° C. in one hour. At this temperature, it was refluxed for 3 hr. Then, with increasing temperature, the acetic acid formed from reaction was distilled off, and thereafter the temperature was increased further to 330° C. under a high shear. At this temperature, polymerization was continued for 3 hr under a vigorous stirring, and subsequently gradual cooling was applied and at 200° C. the polymer was taken out of the tank. The recovered amount of the polymer was 1,716 g (93.5% of calculated value). The polymer was ground with a hammer mill of Hosokawa Micron Co. The particles obtained had an average diameter of 0.09 mm and there were no particles having diameters of 0.5 mm or larger. These particles were placed in an aluminum vessel and heat-treated for 4 hr at 210° C. under a reduced pressure (5 mm Hg). In order to examine melt properties of the particles before and after this heat treatment, their flow temperatures were measured by use of a Koka type flow tester manufactured by Shimadzu Seisakusho. The particles before heat treatment gave 279° C. and the particles after heat treatment gave 290° C. The weight reduction of the particles after heat treatment was measured by use of DSC/TG Thermoflex manufactured by Rigaku Denki, with a temperature increase rate of 10° C./min. From this measurement it was found that the weight reduction at 400° C. is 0.2% and the particles in heat treatment is stable. These heat treated particles were spun by extruding from a hand-made spinning nozzle having a diameter of 1 mm and a length of 5 mm in a nitrogen gas atmosphere. The spinning temperature was 350° C; the nitrogen gas pressure inside the cylinder was 0.2 kg/cm² G, and the winding speed was 160 m/min. The fiber could be wound stably for about 20 min. The fiber surface was uniform and there was observed neither foaming nor burning. The fiber diameter was 15 to 25 μm. Observation of this fiber under a polarized light revealed that the fiber has weak anisotropy. An X-ray diffraction photograph of the fiber showed that it was crystalline and oriented. A tensile test for the fiber gave a strength of 5.5 g/d, an elongation of 1.4% and a modulus of elasticity of 410 g/d. This fiber was heated from room temperature to predetermined temperatures at a rate of 110° C./hr in a nitrogen gas atmosphere, and was treated at these temperatures for 2 hr, by which the fiber showed big improvements in strength, elongation and modulus of elasticity, as indicated in Table 1. According to X-ray diffraction photographs of the heat-treated fibers, crystalline Debye-Scherrer ring was clearer as compared with that of the fiber before heat treatment. The heat-treated fibers have moduli of elasticity equivalent to or higher than that of an aromatic polyamide fiber.

TABLE 1

Results of Tensile Tests of Aromatic Polyester Fibers

| Sample | Atmosphere | Treating Temperature, °C. | Treating Time, hr | Strength, g/d | Elongation, % | Modulus of elasticity, g/d |
| --- | --- | --- | --- | --- | --- | --- |
| Example 1 | | No treating | | 5.5 | 1.4 | 410 |
| | Nitrogen | 320 | 2 | 30.8 | 2.7 | 1420 |
| | " | 300 | 2 | 27.3 | 2.6 | 1190 |
| | " | 270 | 2 | 21.5 | 2.3 | 1320 |
| Comparative Example 4 | Nitrogen | 240 | 2 | 11.5 | 1.8 | 780 |
| Example 2 | Air | 320 | 2 | 17.1 | 2.6 | 920 |
| | " | 280 | 2 | 15.4 | 2.2 | 880 |
| Example 3 | | No treating | | 4.2 | 1.1 | 383 |
| | Nitrogen | 320 | 2 | 26.0 | 3.6 | 1030 |
| | " | 300 | 2 | 26.2 | 2.7 | 1100 |
| Example 4 | | No treating | | 4.5 | 1.3 | 365 |
| | Nitrogen | 300 | 2 | 18.4 | 2.8 | 890 |
| Example 5 | Air | 300 | 2 | 11.6 | 2.4 | 720 |
| Comparative Example 5 | Kevlar #49 of Du Pont Co. | | | 36.9 | 3.7 | 1090 |

Conditions of tensile test:
Distance between chucks 20 mm, deformation rate 0.5 mm/min.

COMPARATIVE EXAMPLE 1

The same polymer as used in Example 1 was ground so as to give particles of slightly larger diameter. The particles obtained had an average diameter of 0.9 mm and contained 8% by weight of particles whose diameters were 3 mm or larger, according to a sizing method. The subsequent procedures were conducted in the same manner as in Example 1. Fiber breakage occured frequently during melt spinning and therefore stable winding could not be made. Separately, the same particles as used for spinning in Example 1 were mixed with particles of the same polymer having diameters of 3 mm or larger so that the latter particles became 10% by weight based on the whole mixture, and this was spun. Also in this case, fiber breakage took place often during spinning, and further there occured foaming in fiber as well as adhesion of decomposition products on fiber surface. Thus, a good fiber was not obtained.

COMPARATIVE EXAMPLE 2

The polymer particles obtained in Example 1 were spun by themselves without undergoing the heat treatment under a reduced pressure. The spinning was more unstable than in Comparative Example 1 and only foamed fibers were obtained.

COMPARATIVE EXAMPLE 3

The polymer in Example 1 was ground and treated for 3 hr at 300° C. in air. The resulting particles had a flow temperature of 358° C. These particles were subjected to melt spinning. At 440° C. or lower, there was no flow under nitrogen gas pressure of 3 kg/cm². At 450° C., flow started but within 1 min the nozzle caused clogging.

COMPARATIVE EXAMPLE 4

The untreated fiber obtained in Example 1 was treated at 240° C. in a nitrogen gas atmosphere. The result of the tensile test for this treated fiber is shown in Table 1. As compared with the treated fibers of Example 1 (treated at 270° C. or higher), this fiber was lower in all of modulus of elasticity, strength and elongation.

EXAMPLE 2

The untreated fiber produced in Example 1 was treated at 320° C. and 280° C. in air for 2 hr. respectively. These treated fibers both showed improvements in all of strength, elongation and modulus of elasticity, as compared with the untreated fiber. However, as compared with the fibers of Example 1 heat-treated in a nitrogen gas atmosphere, the above two treated fibers were lower in strength and modulus of elasticity. This may be due to possible degradation by oxygen.

EXAMPLE 3

To the polymerization system of Example 1 was further added 13.6 g (0.08 mole) of p-phenylphenol, and polymerization was conducted in the same manner as in Example 1. Subsequent treatments were the same as those in Example 1. The particles before spinning had a flow temperature of 271° C. By spinning at 350° C., there was obtained a fiber having a strength of 4.2 g/d, an elongation of 1.1% and a modulus of elasticity of 383 g/d. By treating this fiber at 320° C. in a nitrogen atmosphere, there was obtained a fiber having a diameter of 20 to 30 μm, a strength of 26.0 g/d, an elongation of 3.6% and a modulus of elasticity of 1030 g/d. By similarly treating at 300° C., there was obtained a fiber having a strength of 26.2 g/d, an elongation of 2.7% and a modulus of elasticity of 1100 g/d.

EXAMPLE 4

Into the same polymerization tank as used in Example 1, were added 1121.9 g (8.13 mole) of p-hydroxybenzoic acid, 242.4 g (1.46 mole) of terephthalic acid, 205.8 g (1.24 mole) of isophthalic acid, 502.2 g (2.70 mole) of 4,4'-dihydroxydiphenyl and 1632 g (16 mole) of acetic anhydride. Polymerization was conducted in the same manner as in Example 1. The recovery amount of the polymer produced was 1728 g (94.5% of calculated value). The polymer was ground. According to diameter measurement, the resulting particles had an average diameter of 0.095 mm and there were no particles having diameters of 0.5 mm or larger. These particles were heat-treated for 5 hr at 210° C. under a reduced pressure. The polymer particles before and after heat treatment had flow temperatures of 265° C. and 282° C., respectively. The heat-treated particles were spun at 340° C. in a nitrogen gas atmosphere as in Example 1. The fiber obtained had a diameter of 15 to 35 μm, a strength of 4.5 g/d, an elongation of 1.3% and a modulus of elasticity of 365 g/d. By heat-treating this fiber at 300° C. for 2 hr in a nitrogen atmosphere, there was obtained a fiber having a strength of 18.4 g/d, an elongation of 2.8% and a modulus of elasticity of 890 g/d.

EXAMPLE 5

The untreated fiber obtained in Example 4 was treated at 300° C. for 2 hr in air. The resulting treated fiber had a strength of 11.6 g/d, an elongation of 2.4% and a modulus of elasticity of 720 g/d. As compared with the untreated fiber, this fiber showed improvements in all physical properties, however, as compared with the values of the treated fiber of Example 4, the values of this fiber are lower. This is due to degradation by oxygen.

COMPARATIVE EXAMPLE 6

Kevlar ®# 49, an aromatic polyamide fiber of DuPont, was subjected to a tensile test. This fiber had a diameter of 10 μm and showed a tensile strength of 36.9 g/d, an elongation of 3.7% and a modulus of elasticity of 1090 g/d. When this fiber is compared with the aromatic polyester fibers of this invention (Example 1), the aromatic polyester fibers are slightly superior in modulus of elasticity.

What is claimed is:

1. In a process for producing an aromatic polyester fiber of high strength and high modulus of elasticity represented by the general formula A:

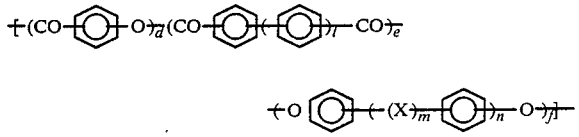

wherein X is an alkylene group of 1 to 4 carbon atoms, —O—, —S—, —SO₂— or —CO—; l, m and n each are 0 or 1; d:e is in the range of 1:5 to 20:1; e:f is in the range of 9:10 to 10:9; and a carbonyl group and an oxy group, two carbonyl groups or two oxy groups are in a meta or para or corresponding position with each other, respectively, a process comprising grinding a polymer of the above general formula A to form ground particles having diameters of less than 3 mm and an average particle diameter of 0.5 mm or smaller; heat-treating the ground particles for 0.5 to 30 hr at a temperature between 100° and 350° C., at which temperature the particles do not fuse, to obtain particles having a melt property such that the temperature at which the particles possess a shear rate of 51/sec (48,000 poise as melt viscosity) under a shear stress of $2.45 \times 10^6$ dynes/cm² is in the range of 200° to 350° C.; melt-spinning the heat-treated particles at a temperature of 250° to 450° C., thereby forming a polymer fiber; and heat-treating the polymer fiber for 0.5 to 50 hr at a temperature between 250° and 450° C., at which temperature the fiber does not fuse.

2. A process for producing an aromatic polyester fiber according to claim 1, wherein the aromatic polyester represented by the general formula A is constituted by residues selected from p-hydroxybenzoic acid residue, m-hydroxybenzoic acid residue, terephthalic acid residue, isophthalic acid residue, 4,4'-dihydroxydiphenyl residue, hydroquinone residue and resorcin residue.

3. A process for producing an aromatic polyester fiber according to claim 1, wherein the heat treatment at a temperature 100° to 350° C. for the polymer particles having an average diameter of 0.5 mm or smaller and not containing particles having diameters of 3 mm or larger is conducted in an inert gas atmosphere or a vacuum atmosphere of 100 mm Hg or lower.

4. A process for producing an aromatic polyester fiber according to claim 1, wherein the melt spinning of the heat-treated particles at 250° to 450° C. is conducted in an inert gas atmosphere.

5. A process for producing an aromatic polyester fiber according to claim 1, wherein the heat treatment of the melt-spun fiber is conducted in an inert gas atmosphere or in a vacuum atmosphere of 100 mm Hg or lower.

6. A process for producing an aromatic polyester fiber according to claim 2, wherein the heat treatment at a temperature 100° to 350° C. for the polymer particles having an average diameter of 0.5 mm or smaller and not containing particles having diameters of 3 mm or larger is conducted in an inert gas atmosphere or a vacuum atmosphere of 100 mm Hg or lower.

7. A process for producing an aromatic polyester fiber according to claim 2, wherein the melt spinning of the heat-treated particles at 250° to 450° C. is conducted in an inert gas atmosphere.

8. A process for producing an aromatic polyester fiber according to claim 3, wherein the melt spinning of the heat-treated particles at 250° to 450° C. is conducted in an inert gas atmosphere.

9. A process for producing an aromatic polyester fiber according to claim 6, wherein the melt spinning of the heat-treated particles at 250° to 450° C. is conducted in an inert gas atmosphere.

10. A process for producing an aromatic polyester fiber according to claim 2, wherein the heat treatment of the melt-spun fiber is conducted in an inert gas atmosphere or in a vacuum atmosphere of 100 mm Hg or lower.

11. A process for producing an aromatic polyester fiber according to claim 3, wherein the heat treatment of the melt-spun fiber is conducted in an inert gas atmosphere or in a vacuum atmosphere of 100 mm Hg or lower.

12. A process for producing an aromatic polyester fiber according to claim 4, wherein the heat treatment of the melt-spun fiber is conducted in an inert gas atmosphere or in a vacuum atmosphere of 100 mm Hg or lower.

13. A process for producing an aromatic polyester fiber according to claim 6, wherein the heat treatment of the melt-spun fiber is conducted in an inert gas atmosphere or in a vacuum atmosphere of 100 mm Hg or lower.

14. A process for producing an aromatic polyester fiber according to claim 7, wherein the heat treatment of the melt-spun fiber is conducted in an inert gas atmosphere or in a vacuum atmosphere of 100 mm Hg or lower.

15. A process for producing an aromatic polyester fiber according to claim 8, wherein the heat treatment of the melt-spun fiber is conducted in an inert gas atmosphere or in a vacuum atmosphere of 100 mm Hg or lower.

16. A process for producing an aromatic polyester fiber according to claim 9, wherein the heat treatment of the melt-spun fiber is conducted in an inert gas atmosphere or in a vacuum atmosphere of 100 mm Hg or lower.

* * * * *